United States Patent [19]

Carpena et al.

[11] Patent Number: 5,597,542
[45] Date of Patent: Jan. 28, 1997

[54] PROCESS FOR THE TREATMENT OF NATURAL APATITES WITH A VIEW TO THE USE THEREOF FOR STORING IRRADIATED FUEL ELEMENTS

[75] Inventors: Joelle Carpena, Jouques; Jean-Louis Lacout, Toulouse, both of France

[73] Assignee: Commissariat A L'Energie Atomique, Paris, France

[21] Appl. No.: 260,013

[22] Filed: Jun. 15, 1994

[30]     Foreign Application Priority Data

Jun. 16, 1993 [FR] France ................................. 93 07265

[51] Int. Cl.$^6$ ........................ C01B 25/32; C01B 25/165
[52] U.S. Cl. ........................ 423/305; 423/308; 423/311
[58] Field of Search ................................. 423/308, 311, 423/305

[56]              References Cited

U.S. PATENT DOCUMENTS

| | | | |
|---|---|---|---|
| 3,684,435 | 8/1972 | Lepomaa et al. | 423/311 |
| 3,919,395 | 11/1975 | Hauge | 423/311 |
| 4,181,703 | 1/1980 | Wengeler et al. | 423/167 |

FOREIGN PATENT DOCUMENTS

| | | | |
|---|---|---|---|
| 2678258 | 12/1992 | France. | |
| 51-71896 | 12/1974 | Japan. | |
| 1470663 | 4/1989 | U.S.S.R. | 423/311 |

OTHER PUBLICATIONS

Chemical Abstracts, vol. 86, No. 1, 3 Jan. 1977, Columbus, Ohio, US; Abstract No. 4142w, Kato Yoshito, Fujita Takao, "Treatment of Carbonate Apatite", p. 368.

Chemical Abstracts, vol. 100, No. 26, 25 Jun. 1984, Columbus, Ohio, US; Abstract No. 212426b, Treushchenko et al., "Selective Extraction of Phosphates and Carbonates from Phosphate Ores of the Kingisepp Deposit Using Sulfuric Acid", p. 137.

Database Inspec. Institute of Electrical Engineers, Stevenage, GB, Inspec. No. 2072408, Hebel W. et al., "CEC Research Activities into the Immobilization of Volatile Radionuclides from Reprocessing", & Conditioning of Radioactive Wastes for Storage and Disposal. Proceedings of an International Symoposium, Utrecht, Netherlands, 21–25 Jun. 1982, pp. 245–251.

Database Inspec. Institute of Electrical Engineers, Stevenage, GB, Inspec. No. 1453245, Krajewski T et al., "Mineral–Contributed Anion Effects on the Retention of Trivalent Actinides in the Environment", & 25th Annual Meeting of the American Nuclear Society, Atlanta, GA, USA, 3–7 Jun. 1979 ISSN 0003–018X, pp. 168–169.

Calcified Tissue International (1982), "Variability of Hydroxyapatite Preparations", R. A. Young and D. W. Holcomb, pp. S17–S32.

Derwent World Patent Index Abstract No. 76–60486X.

*Primary Examiner*—Wayne Langel
*Attorney, Agent, or Firm*—Pearne, Gordon, McCoy & Granger

[57]              ABSTRACT

The invention relates to a process for the treatment of natural apatites with a view to the use thereof for storing irradiated fuel elements.

This process consists of contacting a natural apatite powder with an acid aqueous solution, e.g. dilute $HNO_3$ or HCl for between a few seconds and 10 minutes.

In this way, the physicochemical properties of the natural apatite are improved by modifying its surface composition in order to make it close to that of hydroxyapatite. This modified apatite can be used as a filling material in irradiated fuel element storage containers.

6 Claims, No Drawings

PROCESS FOR THE TREATMENT OF NATURAL APATITES WITH A VIEW TO THE USE THEREOF FOR STORING IRRADIATED FUEL ELEMENTS

The present invention relates to a process for the treatment of natural apatites with a view to the use thereof for storing irradiated fuel elements.

In the direct storage of irradiated fuel elements, the latter are placed in a storage container with materials such as sand, glass balls, etc. for filling the internal spaces between the elements. The function of these filling materials is purely mechanical, but advantage could be taken of the physico-chemical properties of the filling material in order to improve the safety of storage.

For this purpose, consideration has been given to the use of natural phosphates of the apatite type as the filling material. During a possible accident, particularly an entry of water, the reactive surface of the apatite would slow down the migration of the radioactive elements which have come from the irradiated fuel elements.

The capacity of apatites to fix various elements, in particular cations such as strontium, cadmium, cesium, uranium and/or anionic groups such as $VO_4$, $UO_4$, etc. is well known. This capacity is strongly linked with the chemical composition of the surface and the specific surface of the material. Thus, hydroxyapatite leads to a better fixing of cations and anions than natural apatites such as fluoroapatite.

The formula of hydroxyapatite is: $Ca_{10}(PO_4)_6(OH)_2$ with a Ca/P atomic ratio of 1.667.

The three-dimensional structure of hydroxyapatite, which crystallizes in the hexagonal system, is well known, it being a clearly identified compound. However, in most cases the various hydroxyapatite preparation processes lead to slightly differing products, as is described by R. A. Young and D. W. Holcomb in Calcif Tissue Int., 1982, 34, pp 17–32.

Thus, it is possible to describe non-stoichiometric synthetic hydroxyapatite by the more detailed chemical formula:

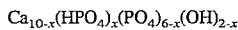

$$Ca_{10-x}(HPO_4)_x(PO_4)_{6-x}(OH)_{2-x}$$

In compounds complying with this formula, there are gaps in the calcium sites and in the hydroxyl sites. They are accompanied by the substitution of phosphate groups $PO_4^{3-}$ by hydrogen phosphate groups $(HPO_4)^{2-}$.

In natural apatites, calcium is often substituted by magnesium or another divalent element such as an alkaline earth metal. Phosphate can also be substituted by carbonate and the hydroxyl ion can be substituted by halogens, as in the case of fluoroapatite.

There are numerous natural calcium phosphates with an apatite structure, but they have less satisfactory fixing properties than synthetic hydroxyapatites. However, they are very inexpensive and are available in unlimited quantities.

Considerable interest is attached to the treatment of natural apatites with a view to improving their fixing properties and making them as satisfactory as synthetic hydroxyapatites.

FR-A-2 678 258 describes a process for the treatment of natural apatites having a biological origin with a view to obtaining therefrom hydroxyapatite or tricalcium phosphate.

According to this process, natural apatite is firstly transformed into dicalcium phosphate by treatment with a strong acid such as 1N HCl and then the dicalcium phosphate is treated by means of a base or is completely dissolved in phosphoric acid and the liquor obtained is treated by a base in order to obtain in both cases hydroxyapatite.

According to the invention, it has been found that a much simpler treatment is sufficient for improving the properties of a natural apatite with a view to making them very close to those of precipitated synthetic hydroxyapatite.

The present invention relates to a process for the treatment of a natural apatite in order to improve its specific surface, its surface reactivity and its cation and anion fixing properties, by modifying its composition in order to make it very close to that of hydroxyapatite.

According to the invention, the process for the treatment of a natural apatite consists of contacting a powder of said apatite with an acid aqueous solution having a pH above 1 for between a few seconds and 10 minutes.

Thus, said treatment consists of performing a very slight acid leaching of the natural apatite using a weak acid solution and for a very short time, which is completely different from the acid dissolving carried out in FR-A-2 678 258, which leads to dicalcium phosphate $Ca(HPO_4)$.

This treatment in particular makes it possible:

to eliminate the remaining gangue, in particular the carbonates (calcite and dolomite), eliminate the finer particles which are the most rapidly dissolved, desorb the surface absorbed ions, produce $HPO_4^-$ groups, which are favourable to cationic fixing and which contribute to the surface reactivity and modify the composition of the surface of the apatite in order to make it close to that of hydroxyapatite.

The acid aqueous solutions used for this treatment can be constituted by dilute hydrochloric acid or dilute nitric acid, preferably having a pH of 1 to 4. For example, it is possible to use dilute nitric acid containing 7 vol. % $HNO_3$.

The natural apatites which can be treated by the process according to the invention can be of a random type. Generally use is made of a natural apatite having a geological origin such as dahlite or francolite.

In order to perform the process according to the invention, the starting product is a natural apatite which is brought into the form of a powder, which can be carried out by crushing the natural apatite, followed by washing with water and drying at a temperature below 100° C., e.g. by dry ventilation or in the oven.

The thus treated apatite powder is then introduced into a dilute acid bath for a very short time, generally between a few seconds and 10 minutes, then it is separated from the bath, e.g. by filtering. It then preferably undergoes rinsing with water and drying in the manner described hereinbefore.

After this treatment, the powder can be directly used for filling the gaps in a storage container into which are introduced irradiated fuel elements, ensuring that the powder grains are well compacted in order to leave a minimum number of empty spaces in, the container.

In the container, the existence of a low (250° C.), but constant temperature, permits a slow ionic diffusion, which will lead to the progressive introduction of the surface-fixed ions into the interior of the apatite structure.

Obviously, it is possible to use the thus modified powder in fields other than the storage of irradiated fuel elements, e.g. as a chemical barrier in the conditioning of nuclear waste, where advantageous use is once again made of its fixing properties.

The following examples illustrate the process according to the invention.

EXAMPLE 1

In this example, the starting product is a natural apatite of the dahlite type of formula $Ca_{10}(PO_4, CO_3)(OH)_{2-y}$ and it is crushed to a grain size of 100 to 150 pm. The powder is then washed with clear water in order to eliminate the fine particles and is dried at a temperature of 80° C. using hot air. The powder is then subject to chemical action in a dilute acid bath constituted by 7% nitric acid, at ambient temperature (20°+5° C.) for 30 to 40 s. The powder is then separated from the bath by filtering and is rinsed with clear water and dried under the same conditions as hereinbefore. This gives a powder having much better cation fixing properties than in the case of the starting powder.

EXAMPLE 2

This example follows the same operating procedure as in example 1 for treating a natural apatite of the francolite type of formula $Ca_{10}(PO_4, CO_3)_6F_{2-y}$, which comes from Morocco and has a relatively unfavourable structure like that of fluoroapatite. At the end of the treatment, there is an increase in the physicochemical absorption coefficient of the said apatite by a factor close to 4 per weight unit.

Therefore the process according to the invention is very advantageous because, by means of a very slight treatment, it makes it possible to significantly improve the properties of a natural apatite, so that it is of interest for various applications and in particular the storage of irradiated fuel elements.

We claim:

1. Process for the treatment of a natural apatite, comprising the step of contacting a natural apatite powder with an acid aqueous solution with a pH above 1 for between a few seconds and 10 minutes to modify the natural apatite surface to better fix cationic and anionic groups contacted therewith.

2. Process according to claim 1, characterized in that the pH of the acid aqueous solution is between 1 and 4.

3. Process according to claim 1, characterized in that the acid aqueous solution is a nitric acid or hydrochloric acid solution.

4. Process according to claim 1, characterized in that the natural apatite is dahlite or francolite.

5. Process according to claim 1, characterized in that the natural apatite powder is obtained by crushing a natural apatite, followed by washing with water and drying.

6. Process according to claim 1, characterized in that the natural apatite powder treated by the acid aqueous solution then undergoes washing with water and drying.

* * * * *